United States Patent
Kikuchi

(10) Patent No.: US 9,483,163 B2
(45) Date of Patent: Nov. 1, 2016

(54) INFORMATION DISPLAY APPARATUS, INFORMATION DISPLAY METHOD, AND COMPUTER READABLE MEDIUM

(71) Applicant: FUJI XEROX CO., LTD., Minato-ku, Tokyo (JP)

(72) Inventor: Yukiko Kikuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 166 days.

(21) Appl. No.: 13/892,646

(22) Filed: May 13, 2013

(65) Prior Publication Data

US 2014/0096080 A1 Apr. 3, 2014

(30) Foreign Application Priority Data

Oct. 1, 2012 (JP) ................. 2012-219327

(51) Int. Cl.
G06F 3/0484 (2013.01)
G06F 3/0485 (2013.01)
G06F 3/0488 (2013.01)

(52) U.S. Cl.
CPC ......... G06F 3/04842 (2013.01); G06F 3/0485 (2013.01); G06F 3/04883 (2013.01)

(58) Field of Classification Search
USPC ........................................................ 715/811
See application file for complete search history.

(56) References Cited

U.S. PATENT DOCUMENTS

| | | | | |
|---|---|---|---|---|
| 6,356,356 B1* | 3/2002 | Miller et al. | ................. | 358/1.15 |
| 8,640,046 B1* | 1/2014 | Jania | ............................ | 715/781 |
| 2002/0083023 A1* | 6/2002 | Rosenkranz | ..... | G07B 17/00193 |
| | | | | 705/410 |
| 2004/0135816 A1* | 7/2004 | Schwartz | ............. | G06Q 10/107 |
| | | | | 715/811 |
| 2005/0182798 A1* | 8/2005 | Todd et al. | .................... | 707/200 |
| 2006/0004873 A1* | 1/2006 | Wong | ................ | G06F 17/30997 |
| 2006/0035632 A1* | 2/2006 | Sorvari | ................. | H04M 1/271 |
| | | | | 455/418 |
| 2006/0173961 A1* | 8/2006 | Turski | .................. | G06Q 10/107 |
| | | | | 709/206 |
| 2007/0067738 A1* | 3/2007 | Flynt | ................. | H04M 1/72522 |
| | | | | 715/810 |
| 2008/0016073 A1* | 1/2008 | Kobayashi | ............. | G11B 27/34 |

(Continued)

FOREIGN PATENT DOCUMENTS

| | | |
|---|---|---|
| JP | 10222340 A | 8/1998 |
| JP | 2006244155 A | 9/2006 |

(Continued)

OTHER PUBLICATIONS iPhone_iOS4_User_Guide—2010—Excerpt.*

(Continued)

*Primary Examiner* — Amy M Levy
(74) *Attorney, Agent, or Firm* — Sughrue Mion, PLLC

(57) ABSTRACT

An information display apparatus includes a display, a receiver, a memory, and a display controller. The display displays plural items in a list format in accordance with an order in a display field. The memory stores therein selection record information representing past record of selection of each of the plural items. The receiver receives an operation for updating items displayed in the display field based on the selection record information. The display controller specifies, when the operation is received by the receiver, at least one of the plural items by referring to the selection record information, and controls the display to display a part of the plural items including the specified item in the list format in accordance with the order in such a manner that the specified item is displayed at a reference position in the display field.

13 Claims, 5 Drawing Sheets

(56) References Cited

U.S. PATENT DOCUMENTS

| | | | |
|---|---|---|---|
| 2008/0122796 A1* | 5/2008 | Jobs | G06F 3/0488 345/173 |
| 2008/0168384 A1* | 7/2008 | Platzer | G06F 3/04845 715/784 |
| 2008/0301569 A1* | 12/2008 | Akagi | G06F 3/0485 715/761 |
| 2009/0055771 A1* | 2/2009 | Nurmi | G06F 3/0482 715/810 |
| 2009/0058820 A1* | 3/2009 | Hinckley | 345/173 |
| 2010/0058240 A1* | 3/2010 | Bull | G06F 3/0485 715/830 |
| 2012/0030569 A1* | 2/2012 | Migos et al. | 715/702 |
| 2014/0043355 A1* | 2/2014 | Kim | G06T 11/60 345/592 |

FOREIGN PATENT DOCUMENTS

| | | |
|---|---|---|
| JP | 2007-95096 A | 4/2007 |
| JP | 2010-198298 A | 9/2010 |

OTHER PUBLICATIONS

Communication dated Mar. 1, 2016, from the Japanese Patent Office in counterpart application No. 2012-219327.

* cited by examiner

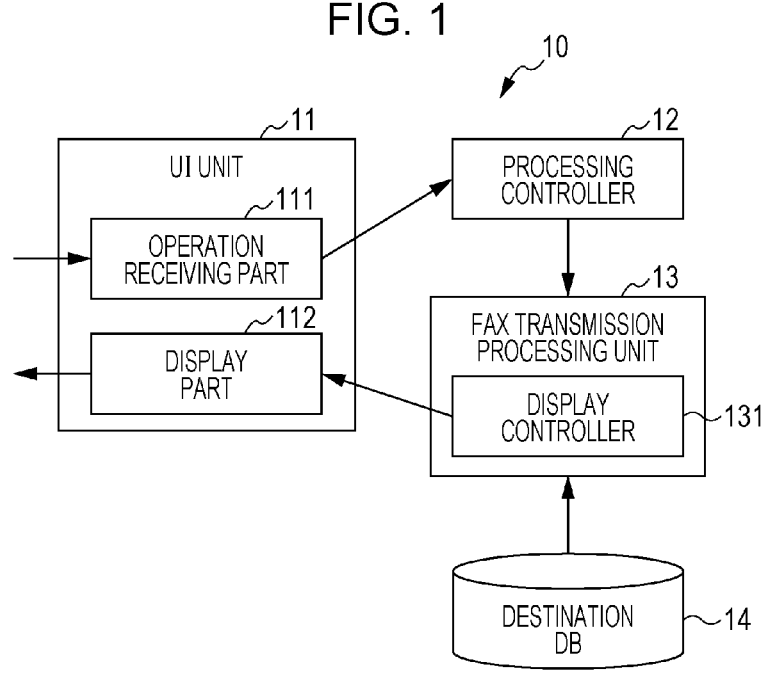
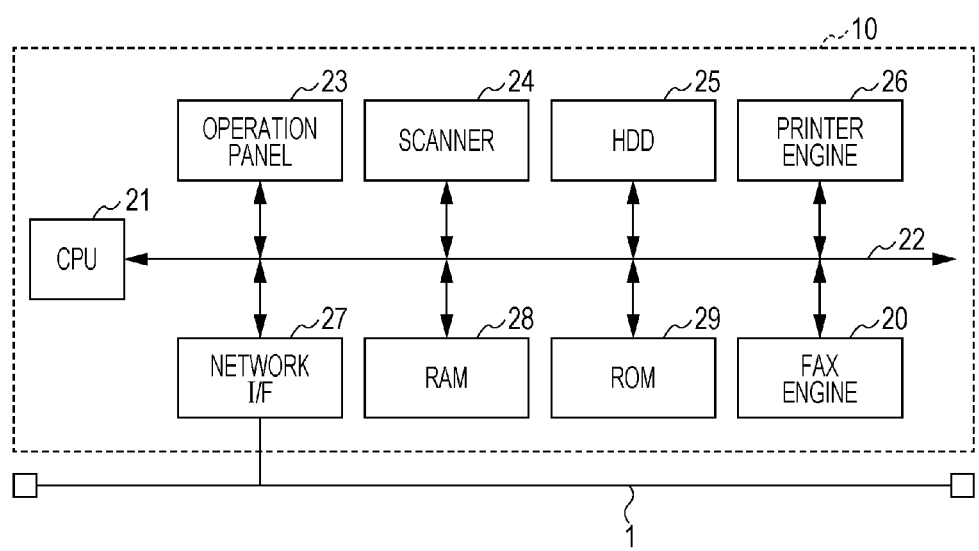

FIG. 3

| ABBREVIATED NUMBER | DESTINATION | FAX NUMBER | NUMBER OF TRANSMISSION TIMES | LAST TRANSMISSION DATE AND TIME |
|---|---|---|---|---|
| 0001 | DESTINATION 1 | | 1 | 01/11/2012 13:20 |
| 0002 | DESTINATION 2 | | | |
| 0003 | DESTINATION 3 | | | |
| 0004 | DESTINATION 4 | | | |
| 0005 | DESTINATION 5 | | 1 | 01/21/2012 11:00 |
| 0006 | DESTINATION 6 | | | |
| 0007 | DESTINATION 7 | | | |
| 0008 | DESTINATION 8 | | | |
| 0009 | DESTINATION 9 | | | |
| 0010 | DESTINATION 10 | | 2 | 02/01/2012 09:09 |
| ⋮ | ⋮ | | ⋮ | ⋮ |
| 0049 | DESTINATION 49 | | | |
| 0050 | DESTINATION 50 | | 10 | 01/23/2012 14:15 |
| 0051 | DESTINATION 51 | | 1 | 02/22/2012 11:30 |
| 0052 | DESTINATION 52 | | | |
| 0053 | DESTINATION 53 | | | |
| 0054 | DESTINATION 54 | | | |
| 0055 | DESTINATION 55 | | 2 | 03/22/2012 11:45 |
| ⋮ | ⋮ | | ⋮ | ⋮ |
| 0098 | DESTINATION 98 | | | |
| 0099 | DESTINATION 99 | | 1 | 01/28/2012 11:29 |
| 0100 | DESTINATION 100 | | 5 | 04/27/2012 16:13 |
| 0101 | DESTINATION 101 | | | |
| ⋮ | ⋮ | | ⋮ | ⋮ | ns
INFORMATION DISPLAY APPARATUS, INFORMATION DISPLAY METHOD, AND COMPUTER READABLE MEDIUM

CROSS-REFERENCE TO RELATED APPLICATIONS

This application is based on and claims priority under 35 USC 119 from Japanese Patent Application No. 2012-219327 filed Oct. 1, 2012.

BACKGROUND (i) Technical Field

The present invention relates to an information display apparatus, an information display method, and a computer readable medium.

(ii) Related Art

In information terminal apparatuses including a relatively small display screen, the situation in which all the display items are not displayed in an information display area on the display screen often occurs. Under such circumstances, various user interfaces for allowing an item that a user desires to select to be displayed in an information display area have been suggested.

SUMMARY

According to an aspect of the invention, there is provided an information display apparatus including a display, a receiver, a memory, and a display controller. The display displays plural items in a list format in accordance with an order in a display field. The memory stores therein selection record information representing past record of selection of each of the plural items. The receiver receives an operation for updating items displayed in the display field based on the selection record information. The display controller specifies, when the operation is received by the receiver, at least one of the plural items by referring to the selection record information, and controls the display to display a part of the plural items including the specified item in the list format in accordance with the order in such a manner that the specified item is displayed at a reference position in the display field.

BRIEF DESCRIPTION OF THE DRAWINGS

Exemplary embodiments of the present invention will be described in detail based on the following figures, wherein:

FIG. 1 is a block diagram illustrating an information display apparatus according to an embodiment of the present invention;

FIG. 2 is a block diagram illustrating the hardware configuration of an image forming apparatus according to the exemplary embodiment;

FIG. 3 is a diagram illustrating an example of the data structure of destination information stored in a destination database in the exemplary embodiment;

DETAILED DESCRIPTION

Figure 4:
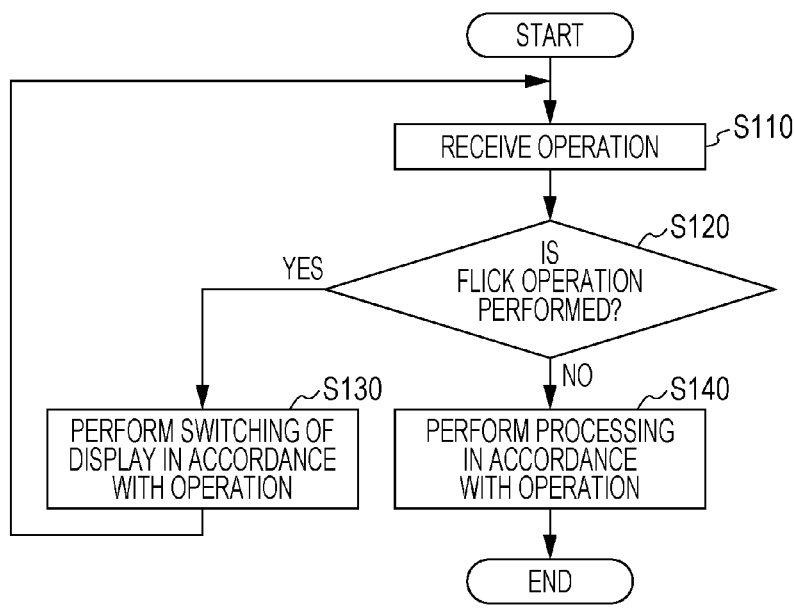
FIG. 4 is a flowchart illustrating a process for switching the display of a destination list displayed in a destination list display area in the exemplary embodiment.

Hereinafter, exemplary embodiments of the present invention will be described with reference to the drawings.

FIG. 1 is a block diagram illustrating an information display apparatus according to an exemplary embodiment of the present invention. FIG. 2 is block diagram illustrating the hardware configuration of an image forming apparatus according to this exemplary embodiment. In this exemplary embodiment, the case where an information display apparatus according to an exemplary embodiment of the present invention is applied to an image forming apparatus will be explained by way of example. In FIG. 2, an image forming apparatus 10 is a compound machine having various functions including a copy function, a scanner function, a facsimile (FAX) transmission function, and the like and includes a built-in computer. Referring to FIG. 2, a central processing unit (CPU) 21 performs operation control for various mechanisms, such as a scanner 24, a printer engine 26, and the like, provided in the image forming apparatus 10, in accordance with a program stored in a read only memory (ROM) 29. An address data bus 22 is connected to the various mechanisms to be controlled by the CPU 21 to perform data communication with the various mechanisms. An operation panel 23 includes a relatively small display screen. The operation panel 23 receives an instruction from a user on the basis of operation for the display screen, and displays information. The scanner 24 reads a document set by a user, and the read document is stored as electronic data into a hard disk drive (HDD) 25 or the like. The HDD 25 stores therein an electronic document and the like read with the scanner 24. A destination database used in this exemplary embodiment is provided in the HDD 25. The printer engine 26 prints an image on output paper in accordance with an instruction from a control program executed by the CPU 21. A network interface (I/F) 27 is connected to a network 1. The network I/F 27 is used for transmission of electronic data generated by the image forming apparatus 10, reception of electronic mail transmitted to the image forming apparatus 10, access to the image forming apparatus 10 via a browser, transmission and reception of facsimile data, and the like. A random access memory (RAM) 28 is used as a work memory at the time of execution of a program and a communication buffer at the time of transmission and reception of electronic data. The ROM 29 stores therein various programs relating to control of the image forming apparatus 10, ciphers for electronic data, and transmission and reception of electronic data. When the various programs are executed, various components, which will be described later, implement specific processing functions. A FAX engine 20 performs transmission and reception of facsimile data via the network IF 27 in accordance with an instruction from a control program executed by the CPU 21.

Referring back to FIG. 1, the image forming apparatus 10 according to this exemplary embodiment includes a user interface (UI) unit 11, a processing controller 12, a FAX transmission processing unit 13, and a destination database (DB) 14. Functional processing not mentioned in the explanation for this exemplary embodiment is omitted from FIG. 1. The UI unit 11 is a user interface unit that includes an operation receiving part 111 that receives a user operation via the operation panel 23 and a display part 112 that displays thereon various menus, information, and the like. In this exemplary embodiment, an example is explained in which the list of destinations is displayed as items in a destination list display area on the operation panel 23 when facsimile transmission is performed as described later. The display part 112 arranged as a display displays thereon the list of destinations in the destination list display area on the operation panel 23. Furthermore, the operation receiving part 111 in this exemplary embodiment is arranged as a receiver and receives a user operation for updating the list of destinations displayed in the destination list display area on the operation panel 23. The processing controller 12 performs the entire control of processing performed in the image forming apparatus 10, such as starting of a processing function designated in accordance with a user operation and the like. The FAX transmission processing unit 13 is an information processing unit that performs facsimile transmission processing, which is one of the processing functions controlled by the processing controller 12. A display controller 131 in the FAX transmission processing unit 13 is arranged as a display controller. The display controller 131 controls screen display in facsimile transmission processing, such as displaying the list of destinations in such a manner that a destination specified by referring to selection record information is displayed at a reference position in the destination list display area on the display part 112 when a user operation is received by the operation receiving part 111. The destination DB 14 is a memory that stores therein selection record information representing the past record of selected destinations.

FIG. 3 is a diagram illustrating an example of the data structure of destination information stored in the destination DB 14 in this exemplary embodiment. Item data that is not mentioned in the explanation provided below is omitted from FIG. 3. Destination information is configured such that a destination as information identifying a destination such as a company name or a department name, the FAX number of the destination, and selection record information are associated with an abbreviated number allocated to the destination. The selection record information used in this exemplary embodiment includes the number of transmission times and the last transmission date and time. As the number of transmission times, the number of times facsimile transmission to a destination has been performed since a certain point in time is set. For example, the certain point in time may be the date and time designated by a user or may be specified using a specific period of time, such as a point in time two months before the current time. Alternatively, the certain point in time may be an initialized (zero-cleared) time. Furthermore, a certain point in time may be automatically designated by the FAX transmission processing unit 13, instead of by user operation. As the last transmission date and time, date and time information of the last date and time when facsimile transmission to the destination was performed is set.

The UI unit 11, the processing controller 12, and the FAX transmission processing unit 13 in the image forming apparatus 10 are implemented by a cooperative operation of the computer provided in the image forming apparatus 10 and a program executed by the CPU 21 provided in the computer. Furthermore, the destination DB 14 is implemented by the HDD 25 provided in the image forming apparatus 10.

Furthermore, a program used in this exemplary embodiment may be provided not only by a communication unit but also by being stored in a computer-readable recording medium such as a compact disc read only memory (CD-ROM), a digital versatile disc-read only memory (DVD-ROM), or the like. Various processing operations are implemented when programs provided by the communication unit or the recording medium are installed into the computer and the CPU of the computer sequentially executes the programs.

An operation performed in this exemplary embodiment will now be described. In this exemplary embodiment, characteristic user operation and display of a destination list based on the user operation in this exemplary embodiment will be explained by way of example of the case where a destination is designated from the destination list displayed on the operation panel 23, with the FAX transmission function implemented by the FAX transmission processing unit 13.

First, a user performs a specific operation from a menu displayed on the operation panel 23 to activate the FAX transmission function. When the FAX transmission function is activated, the FAX transmission processing unit 13 starts operation, and transmits image data of a designated document to a designated destination in accordance with a specific operation performed by the user. When the FAX transmission processing unit 13 executes facsimile transmission as described above, the FAX transmission processing unit 13 increments the number of transmission times for the designated destination by one and updates the last transmission date and time to the date and time when the facsimile transmission was executed in the destination DB 14. Hereinafter, processing for switching the display of a destination list displayed in a destination list display area of the operation panel 23 will be explained with reference to a flowchart illustrated in FIG. 4.

Figure 5:
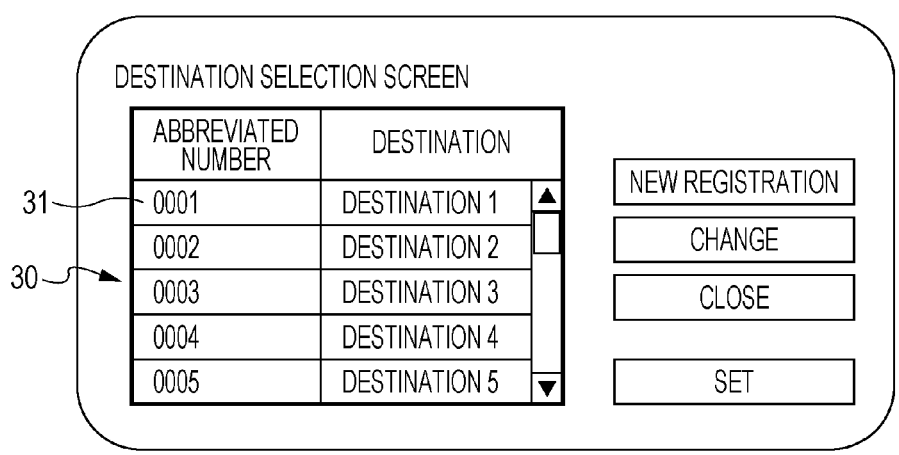
FIG. 5 is a diagram illustrating an example of an initial screen for a destination selection screen displayed on an operation panel in the exemplary embodiment.

As described above, in this exemplary embodiment, the destination list is displayed on the operation panel 23, and the user is allowed to designate a destination from the displayed destination list. FIG. 5 is a diagram illustrating a display example of a destination selection screen displayed on the operation panel 23. An initial screen for the destination selection screen is illustrated in FIG. 5. As illustrated in the example of FIG. 5, when the destination selection screen is displayed for the first time, the first abbreviated number "0001" is displayed at the first position of a destination list display area 30. In this exemplary embodiment, the first position 31 in the destination list display area 30 is defined as a reference position. As is clear from the comparison between the number of destinations registered in the destination DB 14 illustrated in FIG. 3 and the number of destinations that are capable of being displayed on a single destination selection screen, only some of destinations are displayed in the destination list display area 30.

Here, In the case where a destination that the user desires to designate as a facsimile transmission destination is not displayed in the destination list display area 30, the user performs a specific flick operation in order to display the destination that the user desires to designate. The specific flick operation performed here will be explained later.

The UI unit 11 receives a user operation for the operation panel 23 (step S110). In the case where the user operation is not a specific flick operation, such as a screen switching operation, a search button operation, or the like (NO in step S120), the processing controller 12 causes the FAX transmission processing unit 13 to perform processing corresponding to the user operation (step S140).

Figure 6A:
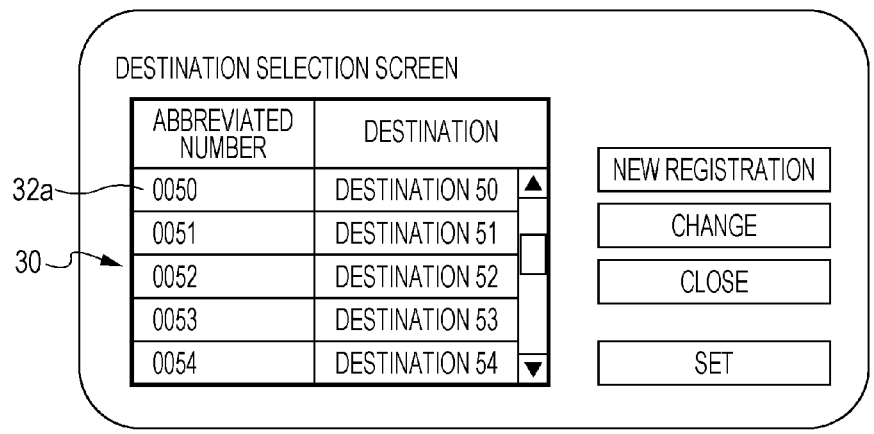
FIG. 6A is a diagram illustrating a display example of a destination selection screen based on the number of transmission times, which is displayed on the operation panel immediately after the initial screen illustrated in FIG. 5 is displayed.

In the case where the user operation is a specific flick operation (YES in step S120), the display controller 131 in this exemplary embodiment refers to the number of transmission times in the destination DB 14 and specifies the destination having the largest number of transmission times. In the example illustrated in FIG. 3, the number of transmission times for a destination 50 is ten, which is the largest number of transmission times. Thus, the display controller 131 performs positioning such that the destination 50 is displayed at the reference position, that is, the first position in the destination list display area 30, and displays the list of destinations including the destination 50 and the subsequent destinations in the destination list display area 30. Accordingly, the display controller 131 performs switching of the display of the destination list display area 30 in accordance with the flick operation (step S130). A display example of the destination list displayed after the switching is performed is illustrated in FIG. 6A. As illustrated in FIG. 6A, destinations 50 to 54 are displayed in the destination list display area 30 in such a manner that the destination 50 is displayed at the first position 32a in the destination list display area 30.

Figure 6B:
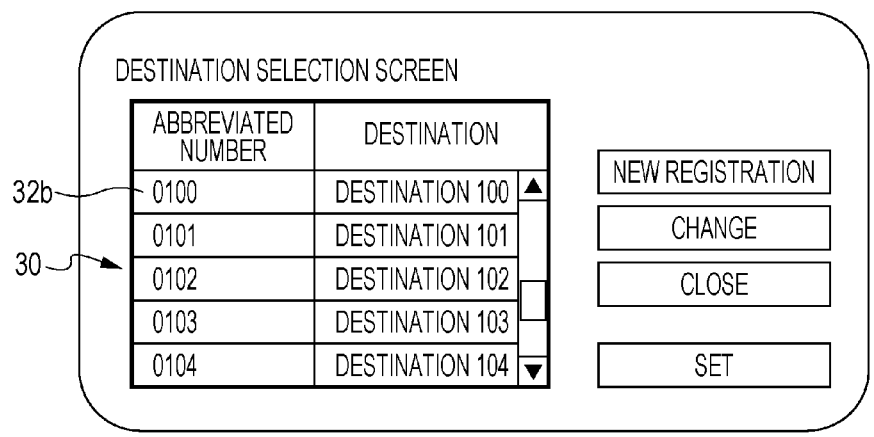
FIG. 6B is a diagram illustrating a display example of a destination selection screen based on the number of transmission times, which is displayed on the operation panel immediately after the display screen illustrated in FIG. 6A is displayed.

Here, in the case where the destination that the user desires to designate as a transmission destination is not displayed in the destination list display area 30, the user performs a further specific flick operation. When the operation receiving part 111 receives the flick operation (step S110 and YES in step S120), the display controller 131 refers to the number of transmission times in the destination DB 14, and specifies the destination having the second largest number of transmission times. In the example illustrated in FIG. 3, the number of transmission times for a destination 100 is five, which is the second largest number of transmission times. Thus, the display controller 131 performs positioning such that the destination 100 is displayed at the first position in the destination list display area 30, and displays the list of destinations including the destination 100 and the subsequent destinations in the destination list display area 30. Accordingly, the display controller 131 performs switching of the display of the destination list display area 30 in accordance with the flick operation (step S130). A display example of the destination list displayed after the switching is performed is illustrated in FIG. 6B. As illustrated in FIG. 6B, destinations 100 to 104 are displayed in the destination list display area 30 in such a manner that the destination 100 is displayed at the first position 32b in the destination list display area 30.

Figure 6C:
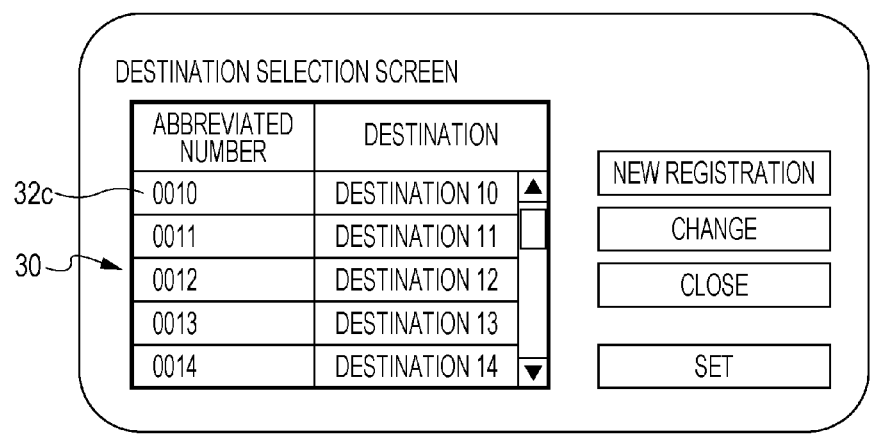
FIG. 6C is a diagram illustrating a display example of a destination selection screen based on the number of transmission times, which is displayed on the operation panel immediately after the display screen illustrated in FIG. 6B is displayed.

Here, in the case where the destination that the user desires to designate as a transmission destination is still not displayed in the destination list display area 30 and a specific flick operation performed by the user in a repetitive manner is then received (step S110 and YES in step S120), the display controller 131 refers to the number of transmission times in the destination DB 14 and specifies the destination having the next largest number of transmission times. In the example illustrated in FIG. 3, the number of transmission times for a destination 10 and a destination 55 is two, which is the third largest number of transmission times. In this case, the display controller 131 performs positioning such that the destination 10, which has a smaller abbreviated number, is displayed at the first position in the destination list display area 30, and displays the list of destinations including the destination 10 and the subsequent destinations in the destination list display area 30. Accordingly, the display controller 131 performs switching of the display of the destination list display area 30 in accordance with the flick operation (step S130). A display example of the destination list displayed after the switching is performed is illustrated in FIG. 6C. As illustrated in FIG. 6C, destinations 10 to 14 are displayed in the destination list display area 30 in such a manner that the destination 10 is displayed at the first position 32c in the destination list display area 30.

Here, in the case where the destination that the user desires to designate is still not displayed, the positioning is performed such that the destination 55 is displayed at the first position in the destination list display area 30 in accordance with the number of transmission times and the order of abbreviated numbers, and the list of destinations is displayed in the destination list display area 30. By repeating the processing operations as described above, switching of the display of the list of destinations is sequentially performed.

As a result, when the destination that the user desires to designate as a transmission destination is displayed in the destination list display area 30, the user performs a specific operation, such as selecting the destination and pressing a set button, to cause the FAX transmission processing unit 13 to perform facsimile transmission.

A specific flick operation will now be explained. First, a "flick operation" represents an operation for slightly sliding a pen or a fingertip that is in contact with a screen. In this exemplary embodiment, a finger or a pen corresponding to an operation unit is generically referred to as a "finger". Nowadays, a flick operation is adopted in scroll display, a Japanese word input method, and the like for smartphone touch screens. In this exemplary embodiment, a flick operation is performed by allowing two fingers to be in contact with the operation panel 23. In the case where a flick operation using a single finger is used as an input method for an existing function in the image forming apparatus 10, when a function provided in this exemplary embodiment is implemented using a single finger, it may be difficult to distinguish the flick operation performed for the function provided in this exemplary embodiment and the flick operation performed for the existing function. Furthermore, changes may be made to operating procedures and the like of the existing function. Thus, in this exemplary embodiment, in order that a flick operation using a single finger is capable of being used in a conventional manner and that a flick operation used for the function provided in this exemplary embodiment and a flick operation used for the existing function are capable of being implemented in a compatible manner, characteristic switching of the display of a destination list in this exemplary embodiment is capable of being implemented by a flick operation using two fingers. In the case where an existing function adopting a flick operation using a single finger does not exist, the characteristic switching of the display of a destination list may be implemented by a flick operation using a single finger. Although in this exemplary embodiment "two" is set as the number of fingers that is different from the number of fingers used for the existing function (in this example, "1"), three or more may be set.

Furthermore, regarding the direction in which fingers are moved for a flick operation, in the case of a flick operation using two fingers, since this flick operation does not overlap a flick operation for an existing function, the fingers may be moved in a desired direction. Obviously, movement in a predetermined direction may be defined as a specific flick operation for performing display switching in this exemplary embodiment. Furthermore, in the case where a function of performing scroll display in accordance with a flick operation using a single finger is adopted in an existing apparatus, normally, an upward flick operation is defined as upward scroll and a downward flick operation is defined as downward scroll. Meanwhile, in the case where leftward and rightward flick operations are not defined, a leftward flick operation or a rightward flick operation may be adopted as a specific flick operation in this exemplary embodiment. As described above, a specific flick operation in this exemplary embodiment may be applied to a flick operation in a direction not used for an existing function.

In the explanation provided above, a destination to be displayed in the destination list display area 30 is specified with reference to the number of times that transmission to the destination has been performed. However, a destination to be displayed in the destination list display area 30 may be specified with reference to the last transmission date and time.

Figure 7A:
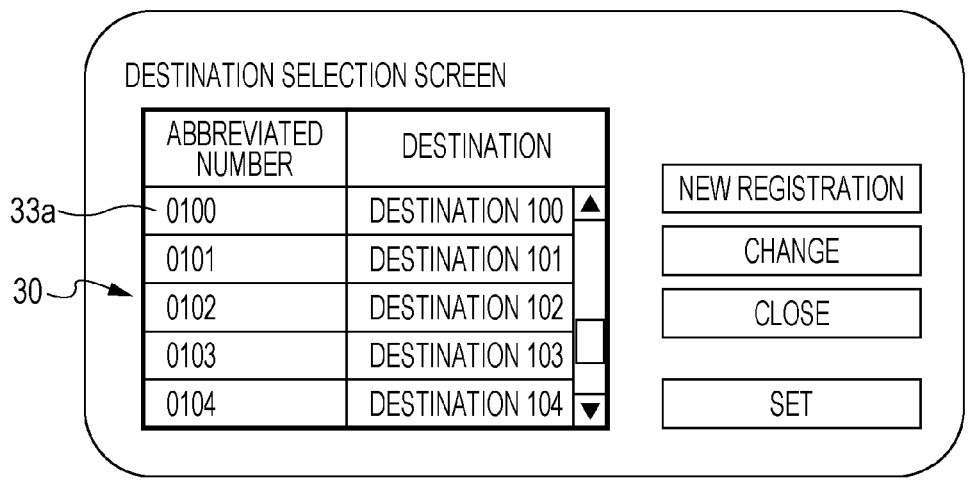
FIG. 7A is a diagram illustrating a display example of a destination selection screen based on the last transmission date and time, which is displayed on the operation panel immediately after the initial screen illustrated in FIG. 5 is displayed.

For example, when a specific flick operation is performed on the initial screen illustrated in FIG. 5 and the operation receiving part 111 receives the flick operation (step S110 and YES in step S120), the display controller 131 in this exemplary embodiment refers to the last transmission date and time in the destination DB 14, and specifies the destination to which transmission was made at the date and time that is the closest to the current time. In the example illustrated in FIG. 3, the last transmission date and time for a destination 100, which is 16:13 on Apr. 27, 2012, is the closest to the current time. In this case, the display controller 131 performs positioning such that the destination 100 is displayed at the first position in the destination list display area 30, and displays the list of destinations including the destination 100 and the subsequent destinations in the destination list display area 30. Accordingly, the display controller 131 performs switching of the display of the destination list display area 30 in accordance with the flick operation (step S130). A display example of the destination list displayed after the switching is performed is illustrated in FIG. 7A. As illustrated in FIG. 7A, destinations 100 to 104 are displayed in the destination list display area 30 in such a manner that the destination 100 is displayed at the first position 33a in the destination list display area 30.

Figure 7B:
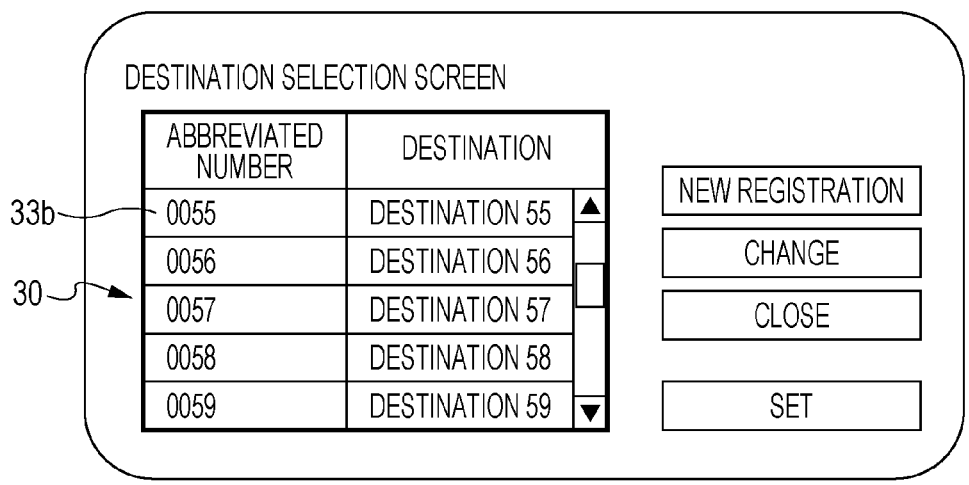
FIG. 7B is a diagram illustrating a display example of a destination selection screen based on the last transmission date and time, which is displayed on the operation panel immediately after the display screen illustrated in FIG. 7A is displayed.

Here, in the case where the destination that the user desires to designate as a transmission destination is not displayed in the destination list display area 30 and a further specific flick operation performed by the user is then received (step S110 and YES in step S120), the display controller 131 refers to the last transmission date and time in the destination DB 14 and specifies the destination to which facsimile transmission was made at the date and time that is the second closest to the current time. In the example illustrated in FIG. 3, the last transmission date and time for a destination 55, which is 11:45 on Mar. 22, 2012, is the second closest to the current time. Thus, the display controller 131 performs positioning such that the destination 55 is displayed at the first position in the destination list display area 30, and displays the list of destinations including the destination 55 and the subsequent destinations in the destination list display area 30. Accordingly, the display controller 131 performs switching of the display of the destination list display area 30 in accordance with the flick operation (step S130). A display example of the destination list displayed after the switching is performed is illustrated in FIG. 7B. As illustrated in FIG. 7B, destinations 55 to 59 are displayed in the destination list display area 30 in such a manner that the destination 55 is displayed at the first position 33b in the destination list display area 30.

Figure 7C:
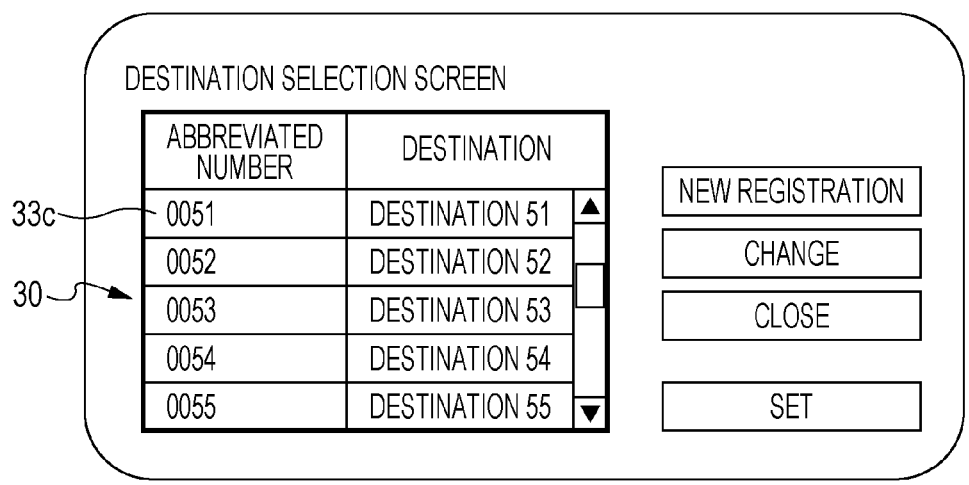
FIG. 7C is a diagram illustrating a display example of a destination selection screen based on the last transmission date and time, which is displayed on the operation panel immediately after the display screen illustrated in FIG. 7B is displayed.

Here, in the case where the destination that the user desires to designate as a transmission destination is still not displayed in the destination list display area 30 and a specific flick operation performed by the user in a repetitive manner is then received (step S110 and YES in step S120), the display controller 131 refers to the last transmission date and time in the destination DB 14 and specifies the destination to which the last facsimile transmission was made at the date and time that is the third closest to the current time. In the example illustrated in FIG. 3, the last transmission date and time for a destination 51, which is 11:30 on Feb. 22, 2012, is the third closest to the current time. Thus, the display controller 131 performs positioning such that the destination 51 is displayed at the first position in the destination list display area 30, and displays the list of destinations including the destination 51 and the subsequent destinations in the destination list display area 30. Accordingly, the display controller 131 performs switching of the display of the destination list display area 30 in accordance with the flick operation (step S130). A display example of the destination list displayed after the switching is performed is illustrated in FIG. 7C. As illustrated in FIG. 7C, destinations 51 to 55 are displayed in the destination list display area 30 in such a manner that the destination 51 is displayed at the first position 33c in the destination list display area 30.

By repeating the processing operations described above, the destination that the user desires to designate as a transmission destination is finally displayed in the destination list display area 30. Unlike the case of the number of transmission times, in the case of the last transmission date and time, destinations to which transmission was performed at the same time do not exist. Thus, destinations are specified in the order in which transmission was performed, that is, from a destination whose last transmission date and time is closer to the current time.

In the explanation provided above, a destination to be displayed at the reference position in the destination list display area 30 is specified by referring to the number of transmission times or the last transmission date and time. However, the destination may be specified by referring to both the number of transmission times and the last transmission date and time. For example, in the case where a destination is specified by referring to the number of transmission times, if destinations having the same number of transmission times exist, a destination may be specified in accordance with the sequential order of the last transmission date and time, instead of in accordance with the sequential order of abbreviated number.

Furthermore, for example, in the case of a rightward flick operation, the list of destinations may be displayed in accordance with the number of transmission times, and in the case of a leftward flick operation, the list of destinations may be displayed in accordance with the last transmission date and time. By allowing both the features to be used at the same time as described above, a user may be able to select a feature in accordance with the direction of a flick operation.

Furthermore, in this exemplary embodiment, the reference position at which a destination specified by referring to the number of transmission times or the last transmission date and time is to be displayed is set to the first position in the destination list display area 30. However, the reference position is not limited to the first position in the destination list display area 30. For example, the reference position may be set to any position, such as the last position or an intermediate position in the destination list display area 30.

Furthermore, in this exemplary embodiment, for example, destinations are specified in decreasing order of the number of transmission times in accordance with a specific flick operation. In the case where a rightward flick operation is adopted as the specific flick operation, for example, when a leftward flick operation is performed, destinations may be specified in ascending order of the number of transmission times. That is, although switching of the destination list is performed as illustrated in FIG. 6A, FIG. 6B, and FIG. 6C in that order in the explanation provided above, switching of the destination list may be performed as illustrated in FIG. 6C, FIG. 6B, and FIG. 6A in that order, which is reverse to the order described in the explanation provided above. That is, when a second flick operation, which is different from a first flick operation, is performed, display for canceling the first flick operation, that is, so-called "return" display, may be provided.

Furthermore, although a flick operation is adopted on the assumption that a user interface screen including a display screen having a relatively small display area is used in this exemplary embodiment, if there is more space on the screen, buttons may be provided so that the above-described feature may be implemented. That is, by displaying a display switching button based on the number of selection times and a display switching button based on the last transmission date and time on the operation panel 23, switching of the display of a destination list displayed in the destination list display area 30 may be performed in accordance with a button operation performed by a user.

Furthermore, in this exemplary embodiment, the case where the exemplary embodiments are applied to the image forming apparatus 10 has been explained by way of example. However, the exemplary embodiments may be applied to any information apparatus including a display screen that is capable of receiving a user operation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information display apparatus comprising:
   a display that displays a plurality of items in a list format in accordance with a predetermined order in a display field,
       each item in the list comprising a first field,
       the predetermined order dependent upon the first field;
   a memory configured to store selection record information representing a past record of a selection of each of the plurality of items; and
   at least one processor configured to implement a receiver and a display controller,
   wherein the receiver is configured to receive one or more display operations for updating which items are displayed in the display field based on the selection record information,
   wherein the display controller is configured to:
       specify, in response to a first display operation being received by the receiver, at least one item of the plurality of items based on a highest ranking of the selection record information,
       control the display to display a part of the plurality of items including the specified at least one item in the list format in such a manner that the specified item is displayed at a reference position in the display field along with one or more previous or subsequent items of the plurality of items according to the predetermined order, and
       specify, in response to each next display operation being received by the receiver, a next highest at least one item of the plurality items based on the ranking of the selection record information and control the display to display the next part of the plurality of items including the specified next at least one item at the reference position in the display field.

2. The information display apparatus according to claim 1,
   wherein the selection record information comprises a number of times each of the plurality of items is selected, and the highest ranking of the selection record information is the greatest number of times a particular item has been selected.

3. The information display apparatus according to claim 2,
   wherein the selection record information further comprises an abbreviated number, and wherein the display controller is configured to, in a case where the selection record information indicates at least two items of the plurality of items having a same number of selections, control to display the at least two items of the plurality of items in a sequential order according to the abbreviated number.

4. The information display apparatus according to claim 2,
   wherein the selection record information comprises a latest selection date and time information of each of the plurality of items, and wherein the display controller is configured to, in a case where the selection record information indicates at least two items of the plurality of items having a same number of selections, control to display the at least two items of the plurality of items in a sequential order according to the latest selection date and time information.

5. The information display apparatus according to claim 1,
   wherein the selection record information comprises a latest selection date and time information of each of the plurality of items, and the highest ranking of the selection record information is the most recent selection date and time a particular item has been selected.

6. The information display apparatus according to claim 1, wherein the first display operation is a flick operation.

7. The information display apparatus according to claim 6, wherein the flick operation comprises a number of touches and is different from a number of touches used for other functions.

8. The information display apparatus according to claim 1, wherein the reference position is a first position in the display field.

9. The information display apparatus according to claim 1,
wherein the selection record information comprises a count field and a date field,
wherein each display operation comprises either a first operation for updating the displayed items or a second operation for updating the displayed items,
wherein the first operation is different than the second operation,
wherein, when the receiver receives the first operation, the display controller is configured to specify the item according to a first highest ranking based on the count field of the selection record information, and
wherein, when the receiver receives the second operation, the display controller is configured to specify the item based according to a second highest ranking based on the date field of the selection record information.

10. An information display method comprising:
displaying a plurality of items in a list format in accordance with a predetermined order in a display field, each item in the list comprising a first field, the predetermined order dependent upon the first field;
storing selection record information representing a past record of a selection of each of the plurality of items;
receiving one or more display operations for updating which items are displayed in the display field based on the selection record information; and
specifying, in response to a first display operation being received, at least one of the plurality of items based on a highest ranking of the selection record information, and controlling a part of the plurality of items including the specified at least one item to be displayed in the list format in such a manner that the specified item is displayed at a reference position in the display field along with one or more previous or subsequent items of the plurality of items according to the predetermined order, and
specifying, in response to each next display operation being received, a next highest at least one item of the plurality items based on the ranking of the selection record information and displaying the next part of the plurality of items including the specified next at least one item at the reference position in the display field.

11. A non-transitory computer readable medium storing a program causing a computer to execute a process for displaying information, the process comprising:
displaying a plurality of items in a list format in accordance with a predetermined order in a display field, each item in the list comprising a first field, the predetermined order dependent upon the first field;
storing selection record information representing a past record of a selection of each of the plurality of items;
receiving one or more display operations for updating which items are displayed in the display field based on the selection record information; and
specifying, in response to a first display operation being received, at least one of the plurality of items based on a highest ranking of the selection record information, and controlling a part of the plurality of items including the specified at least one item to be displayed in the list format in such a manner that the specified item is displayed at a reference position in the display field along with one or more previous or subsequent items of the plurality of items according to the predetermined order, and
specifying, in response to each next display operation being received, a next highest at least one item of the plurality items based on the ranking of the selection record information and displaying the next part of the plurality of items including the specified next at least one item at the reference position in the display field.

12. An information display apparatus comprising:
a touch display panel configured to display a list of a plurality of items in accordance with a predetermined order and to receive a flick operation,
each item in the list comprising a first field,
the predetermined order dependent upon the first field;
a memory configured to store a number of selection times that each of the plurality of items has been selected and a selection date and time at which each of the plurality of items has been selected; and
at least one processor configured to execute a specifying unit and a determining unit,
the specifying unit configured to specify an item having been selected greater than a predetermined number of times or an item having been selected on a date and time that is more recent than a predetermined date and time, and the determining unit configured to determine whether or not a direction of the flick operation substantially corresponds to a scroll direction for the displayed list of items,
wherein the at least one processor is further configured to execute a display controller configured to scroll the list of the plurality of items, in a case where the direction of the flick operation substantially corresponds to the scroll direction, in the direction of the flick operation,
wherein in a case where the direction of the flick operation does not substantially correspond to the scroll direction, the display controller is configured to display a part of the plurality of items including the specified item specified by the specifying unit in a list format in accordance with the predetermined order in such a manner that the specified item is displayed at a reference position in a display field based on a highest ranking of selection record information including the number of selection times and the selection date and time along with one or more previous or subsequent items of the plurality of items according to the predetermined order, and
specifying, each time the flick operation does not substantially correspond to the scroll direction, a next highest at least one item of the plurality items based on the ranking of the selection record information and displaying the next part of the plurality of items including the specified next at least one item at the reference position in the display field.

13. An information display apparatus comprising:
a touch display panel configured to display a list of a plurality of items in accordance with a predetermined order and to receive a flick operation,
  each item in the list comprising a first field,
  the predetermined order dependent upon the first field;
a memory configured to store a number of selection times that each of the plurality of items has been selected and a selection date and time at which each of the plurality of items has been selected; and
at least one processor configured to execute a specifying unit and a determining unit, the specifying unit configured to specify an item having been selected greater than a predetermined number of times or an item having been selected on a date and time that is more recent than a predetermined date and time, and the determining unit configured to determine whether the flick operation is based on a single touch,
wherein the at least one processor is further configured to execute a display controller configured to scroll the list of the plurality of items, in a case where the flick operation is based on a single touch, the items in the list in a direction of the flick operation, and
wherein in a case where the flick operation is not based on a single touch, the display controller is configured to display a part of the plurality of items including the specified item specified by the specifying unit in a list format in accordance with the predetermined order in such a manner that the specified item is displayed at a reference position in a display field based on a highest ranking of selection record information including the number of selection times and the selection date and time along with one or more previous or subsequent items of the plurality of items according to the predetermined order, and
specifying, each time the flick operation does not substantially correspond to the scroll direction, a next highest at least one item of the plurality items based on the ranking of the selection record information and displaying the next part of the plurality of items including the specified next at least one item at the reference position in the display field.

* * * * *